United States Patent Office 3,105,337
Patented Oct. 1, 1963

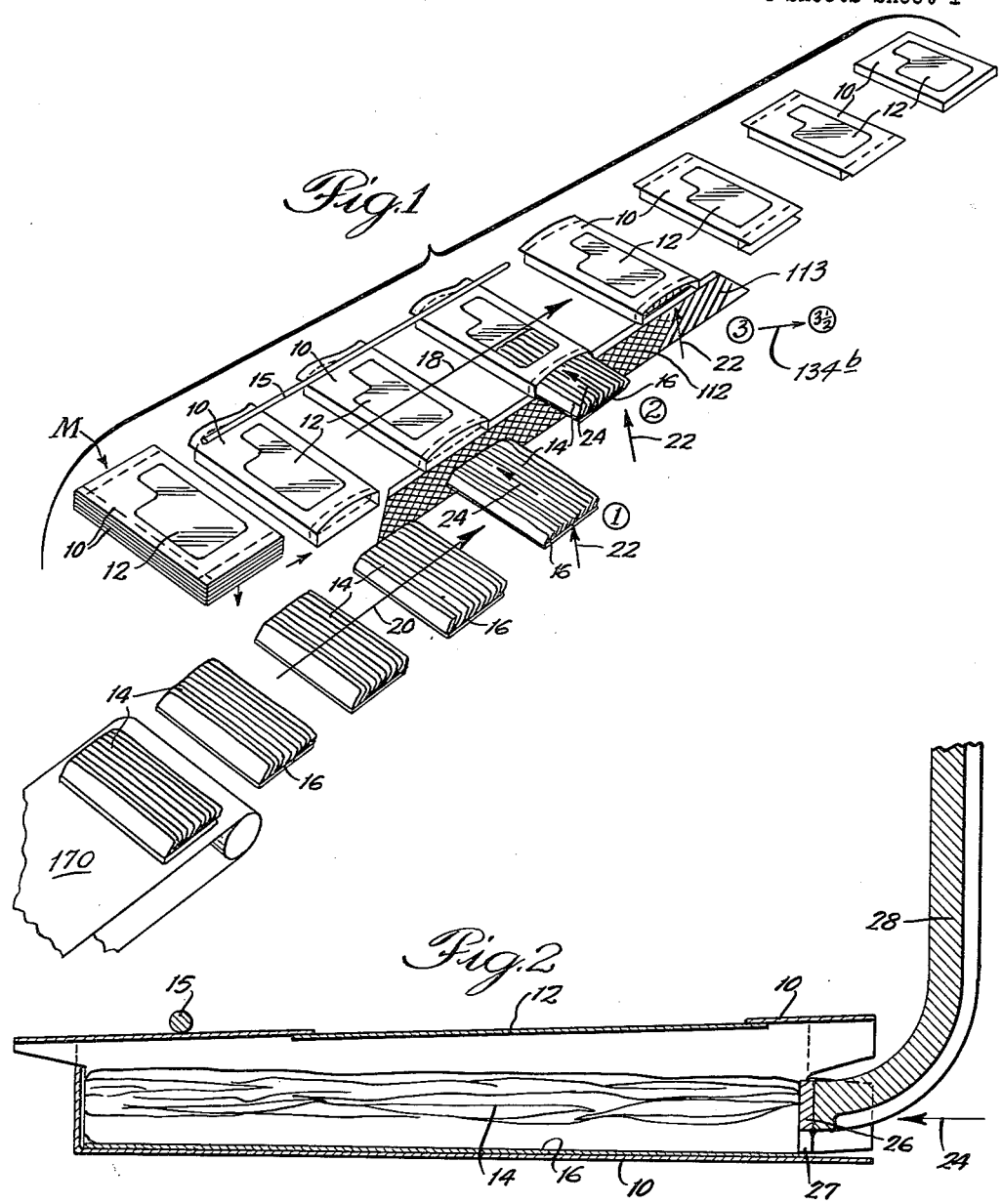

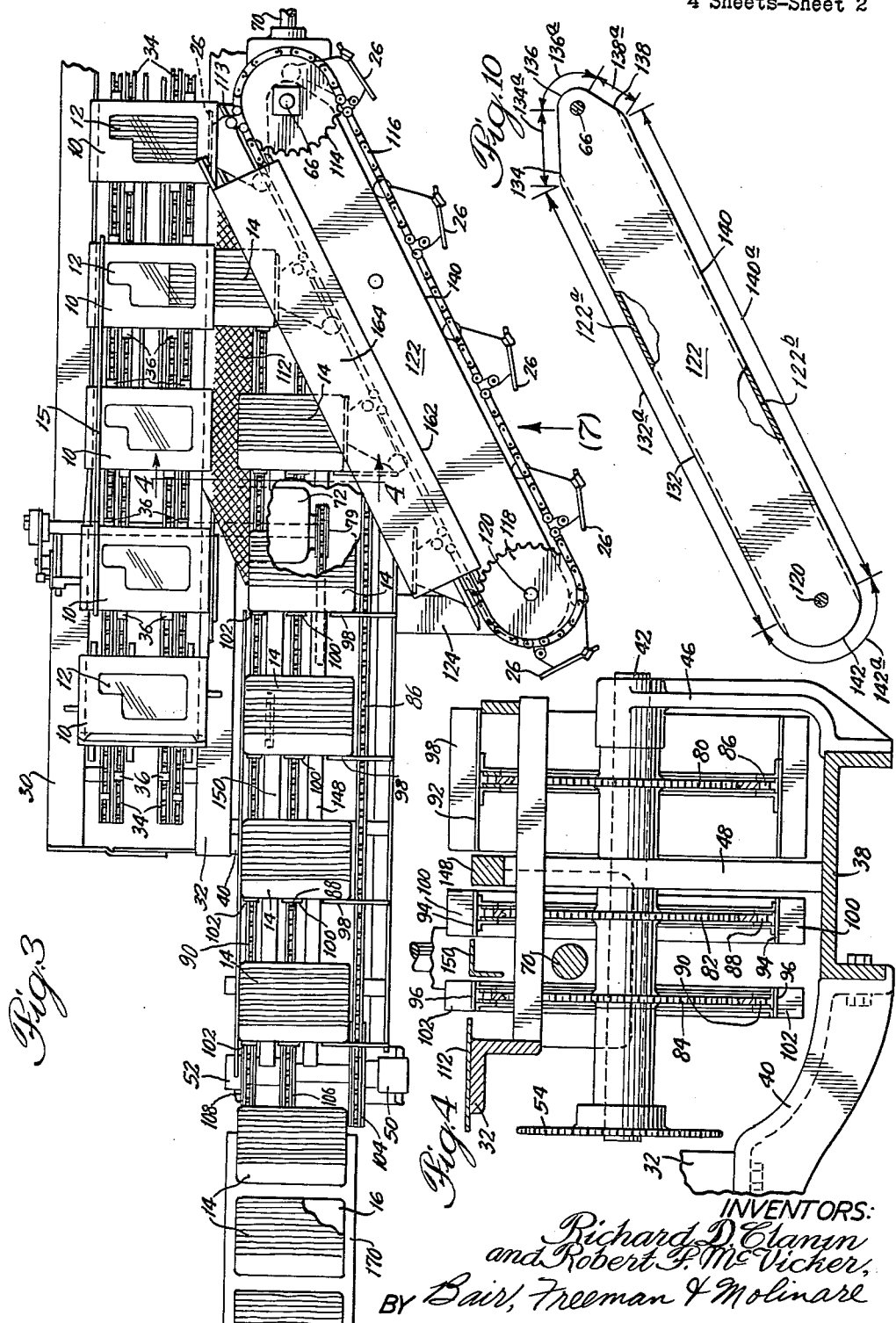

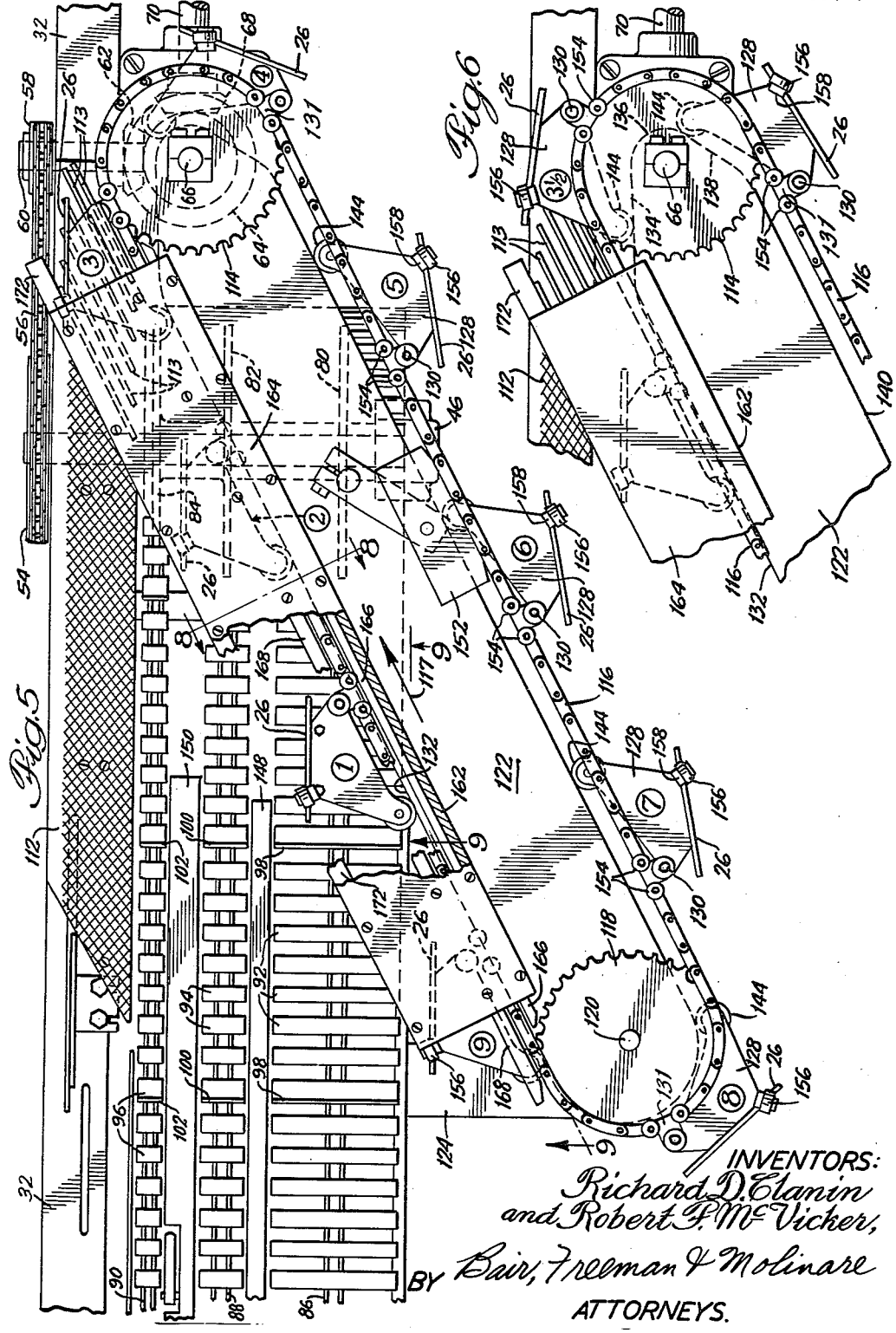

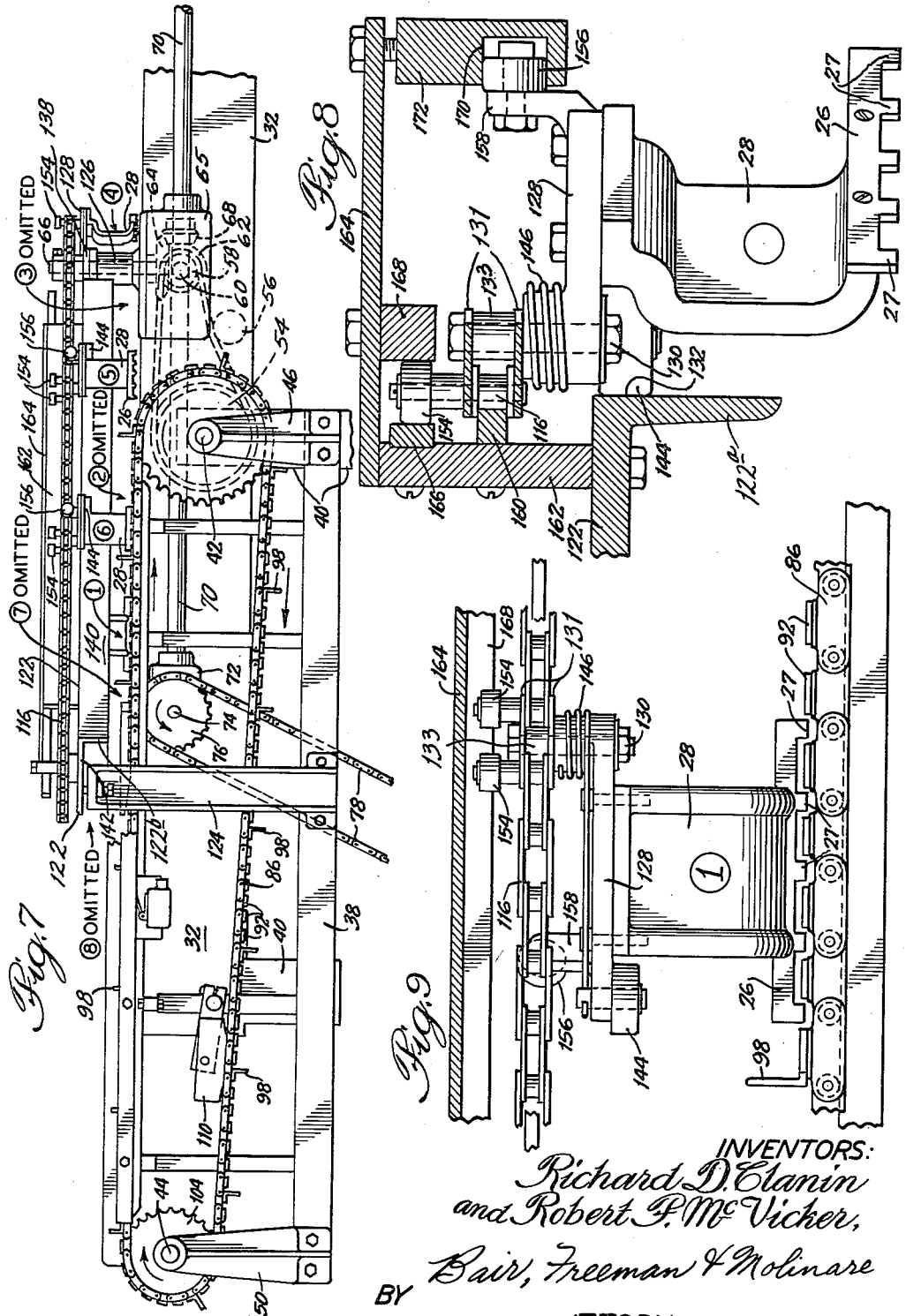

3,105,337
PRODUCT FEEDER FOR CARTONING MACHINE
Richard D. Clanin and Robert F. McVicker, Anderson, Ind., assignors to Lynch Corporation, Anderson, Ind., a corporation of Indiana
Filed Apr. 5, 1961, Ser. No. 100,988
6 Claims. (Cl. 53—251)

This invention relates to a product feeder for a cartoning machine of the kind shown in the copending application of Clanin and Hansen, Serial No. 831,297, filed August 3, 1959, now Patent No. 2,999,344.

One object of the invention is to provide a feeding machine for product such as sliced bacon, frozen foods and the like which automatically feeds the product into cartons of a cartoning machine, thereby eliminating "hand feeding," for instance between an automatic bacon slicer and check weigh unit, and the cartoning machine disclosed in said copending application.

Another object is to provide means for automatically feeding product such as bacon, frozen food and the like into spaced cartons on an infeed conveyor of the cartoning machine, comprising a continuously moving slatted belt running parallel with the conveyor of the cartoner and at the same speed, our feeding machine moving the product forward along drag strips slightly higher than the slats of the belt which exert friction on the bottom of the product to hold it until a lug on the slatted belt contacts it. Then as the product is moved along by the lug, a pusher carried on a chain slanted at an angle to the slatted belt moves through the slats for pushing the product along a line perpendicular to the movement of the slatted belt which results in movement of the product off the slatted belt and into the opened carton at approximately the same point where other machines are hand fed.

Still another object is to provide an arrangement which transfers product laterally from a feeder conveyor to a cartoner conveyor, across an intervening space between the two which may be provided with a stationary shelf, the pushers of the feeder conveyor effecting movement of the product across this shelf to the cartoner conveyor while both conveyors so engage the product as to move it in an advance direction at the same time it is being moved laterally by the feeder conveyor.

A further object is to provide the feeder conveyor with feeder elements which are cam controlled so that once the product is transferred from the feeder conveyor into cartons on the cartoner conveyor the pushers will then retract from the product so as not to disturb subsequent cartoning operations performed in the cartoning machine, and will traverse a return path after which they are again cammed into position for performing their transfer operation.

Still a further object is to provide means for transferring product from one conveyor to another conveyor parallel thereto by lateral movement of the product accomplished by a pusher chain arranged at such angle and operated at such speed that the resultant movement of pushers thereon are forward at the same speed as the two conveyors but laterally also for smoothly and efficiently pushing the product from one conveyor to the other.

An additional object is to provide the pusher chain with stabilizing and camming arrangements that insure proper engagement with the product for pushing it from the one conveyor to the other, and pusher fingers that so coact with a slatted conveyor as to insure proper coaction of the fingers with the product during the pushing operation.

With these and other objects in view, our invention consists in the construction, arrangement and combination of the various parts of our product feeder for cartoning machines, whereby the objects above contemplated are attained, as hereinafter more fully set forth, pointed out in our claims and illustrated in detail on the accompanying drawings wherein:

FIG. 1 is a perspective view of cartons and product being advanced by the cartoning machine of the copending application hereinbefore referred to and the product being fed into the cartons in accordance with our present product feeder in order to illustrate what is accomplished by our feeder;

FIG. 2 is a vertical sectional view through a carton and product showing a feeder finger at the final feed-in position for the product with respect to the carton;

FIG. 3 is a plan view of our feeder and adjacent portions of a cartoning machine, and a product conveyor for conveying product to our feeder and the cartoning machine;

FIG. 4 is an enlarged vertical sectional view on the line 4—4 of FIG. 3 showing details of construction;

FIG. 5 is an enlargement of a portion of FIG. 3 showing in greater detail a plan view of our feeder with parts thereof broken away to show further details;

FIG. 6 is a view similar to the right hand end of FIG. 5 showing an intermediate position of a feeder unit and its coaction with a cam therefor;

FIG. 7 is a side elevation of FIG. 3 as viewed in the direction of the arrow (7) adjacent the bottom thereof;

FIG. 8 is an enlarged sectional view on the line 8—8 of FIG. 5 to show details of a feeder unit and the control thereof;

FIG. 9 is an enlarged elevation of one of the feeder units and adjacent parts as viewed on the line 9—9 of FIG. 5; and FIG. 10 is a diagram of a feeder cam of our machine.

On the accompanying drawings we have used the reference numeral 10 to indicate a carton such as one for sliced bacon and 12 a window thereof of cellophane or the like. Product 14 is shown in the form of sliced bacon supported on "boards" 16 of cardboard or plastic material.

In FIG. 1 the carton feed direction is indicated by an arrow 18 and product in-feed direction by an arrow 20, the cartons entering the cartoning machine from a magazine (not illustrated) at the position indicated as M. Arrows 22 indicate product pushing directions whereby the resultant product feed direction into the carton is in accordance with arrows 24. During the product pushing operation for feeding the product into the carton the upper panel of the carton is bowed upwardly by the cartoning machine hereinbefore referred to in our copending application. The product pushing operation for feeding the product into the carton is accomplished by feed fingers or pushers 26 shown in FIG. 2 supported by feed finger arms 28 of our product feeder machine.

The cartoning machine has left and right side frames 30 and 32 respectively as shown in FIG. 3, and carton conveying chains 34 on which lugs 36 are provided for holding and advancing the cartons 10. The lugs 36 hold the cartons with their upper panels bowed upwardly to facilitate entry of the product 14 at several of the stations as illustrated in FIG. 1 and as fully disclosed in the copending application above referred to. A rod 15 holds the closed end of the carton depressed whereas top panel at the open end bulges upwardly.

Our feeder for the cartoning machine 30—32—34—36 will now be described. A supporting member 38 of channel shape is provided as shown in FIGS. 4 and 7 which is mounted with respect to the cartoning machine by means of a pair of hangers 40 secured to the right side frame 32 of cartoning machine, one spaced from the left hand end of the supporting member 38 and one at its right hand end in FIG. 7. A front conveyor shaft 42 and a rear conveyor shaft 44 are journaled with respect to the supporting member 38, in bearing brackets 46 and 48 for the shaft 42 as shown in FIGS. 4 and 7 and in bearing brackets 50 and 52 for the shaft 44 as shown in FIGS. 3 and 7. A sprocket 54 shown in FIGS. 4, 5 and 7 is provided on the front conveyor shaft 42 for driving the same, the sprocket being driven by a chain 56 and a sprocket 58. The sprocket 58 is on a stub shaft 60 terminating within a gear box 65 in a bevel pinion 62 meshing with a bevel gear 64 on a vertical shaft 66. Also meshing with the bevel gear 64 is a bevel pinion 68 on a drive shaft 70 that extends alongside the side frame 32 and into a gear box 72. Within the gear box suitable gears are provided for driving the shaft 70 from a shaft 74 on which is mounted a sprocket 76 connected by a chain 78 to a suitable sprocket of the cartoning machine so that our feeder is driven in timed relation to the cyclic operation of the cartoning machine.

Referring to FIG. 4 three sprockets 80, 82 and 84 are provided on the conveyor shaft 42 around which infeed conveyor chains 86, 88 and 90 respectively extend. The chains are provided with spaced slats 92, 94 and 96 as shown in FIG. 5 and which are omitted from FIG. 3. Periodically the slats have upstanding flanges 98, 100 and 102 the purpose of which will hereinafter appear. The rear ends of the chains 86, 88 and 90 pass around sprockets 104, 106 and 108 on the rear conveyor shaft 44. In FIG. 7 we shown a chain tension shoe 110 coacting with the lower stretches of the chains 86, 88 and 90. The conveyor chain arrangement 86—88—90 in three sections is necessitated by the position of the drive shaft 70 already existing on the cartoning machine (see FIG. 4) and the chain 78 which is in alignment with the bearing bracket 48 in FIG. 4.

Between the in-feed conveyor chains 86—88—90 and the carton conveying chains 34 of the cartoner a stationary transfer shelf 112 is provided as shown in FIGS. 1, 3 and 5 to bridge the gap between the two conveyors which of necessity, because of the side frame 32 and supporting means for the in-feed conveyor chains, must be spaced apart. At the right hand end of the shelf 112 we provide a stationary transfer grating 113 which forms a continuation of the shelf and provides for the passage of the extensions 27 of the feed fingers 26 which would otherwise be interfered with by the shelf if it extended into their path.

The upper end of the vertical shaft 66 in FIG. 7 is provided with a feeder sprocket 114 around which a feeder chain 116 extends, traversing also a rear feeder sprocket 118. The direction of travel of the chain 116 is indicated by the arrow 117 on FIG. 5. The sprocket 118 is mounted on a second vertical shaft 120 suitably journaled on a horizontal, channel-shaped frame member 122 supported at its rear end by a bracket 124 secured to the supporting member 38 and at its front end to a hub 126 of the gear box 65 for the bevel pinions 62 and 68 and the bevel gears 64. The flanges of the channel 122 are indicated as 122a and 122b.

The feeder chain 116 has nine of the feed finger arms 28 supported thereby and terminating in the feed fingers or pushers 26 hereinbefore referred to. Each feed finger arm 28 as shown in FIGS. 5, 7, 8 and 9 is supported by a pivot bracket 128 pivoted at 130 to a pair of special chain links 131 of the feeder chain 116 between which a spacer 133 is located. The horizontal frame member 122 is provided with a plurality of cam faces 132 (on the flange 122a), 134, 136, 138, 140 (on the flange 122b) and 142 as shown in FIG. 10, the extent of each cam face being indicated by appropriate dimension lines 132a to 142a respectively. Each pivot bracket 128 has a cam roller 144 to coact with the cam faces just described, the roller trailing the pivot 130 as illustrated in FIGS. 5, 7 and 9. A spring 146 is provided for each pivot bracket to normally retain its cam roller 144 in contact with the cam faces of the horizontal frame member 122.

As shown in FIGS. 8 and 9 each pusher 26 is provided with spaced extensions 27 that pass between the slats 92, 94 and 96 of the conveyor end feed conveyor chains 86, 88 and 90 respectively. Drag strips 148 and 150 are provided between the in-feed conveyor chains 86 and 88, and 88 and 90 respectively for a purpose which will hereinafter appear. As shown in FIG. 4, these drag strips project slightly above the upper faces of the slats 92, 94 and 96 and their right hand ends terminate just prior to position (1) in FIG. 5. A chain tension shoe 152 similar to the shoe 110 is provided for the feeder chain 116.

For stabilizing the feeder chain 116 and the pushers 26 we provide stabilizing rollers 154 and 156 respectively journaled on the chain at each special link 130, and on extensions 158 of each pivot bracket 128 as shown in FIGS. 5, 8 and 9. The chain itself along the cam face 132 traverses a stabilizing bar 160 secured to a vertical plate 162 which in turn is secured to the horizontal frame member 122. A horizontal plate 164 is secured to the upper edge of the vertical plate 162 and carries a pair of track bars 166 and 168 for the rollers 154 whereas the rollers 156 travel in a grooved track 170 of a vertical plate 172 secured to the outer edge of the horizontal plate 164.

*Practical Operation*

Referring to FIGS. 1 and 3 a product delivery conveyor or the like 170 delivers units of product (board 16 and product 14) to the infeed conveyor 86—88—90, depositing them on the slats 92, 94 and 96 thereof. The drag strips 148 and 150 provide friction that lets the flanges 98, 100 and 102 pick up and smoothly convey the units of product which are properly spaced thereby in relation to the cycles of operation of the cartoning machine and its conveyor 34. Alternatively the infeed conveyor can be fed by hand. The infeed conveyor moves the units of product in the direction of the arrow 20 which is parallel to the direction of carton movement 18 and at the same speed, the two being synchronized by driving the feeder conveyor from the cartoning machine.

In FIG. 5 the nine product feeders that terminate in the pushers 26 are illustrated at nine different positions (1) to (9) inclusive. Just prior to reaching position (1) the pusher 26 shown at this position, cammed out by the cam surface 132, will have engaged one unit of product on the infeed conveyor and will have started to move it laterally of the conveyor and toward the carton 10 aligned therewith as illustrated at position (1) in FIG. 1. Since the direction of the feeder chain 116 is according to the arrow 117 in FIG. 5 (which is at an angle relative to the directions 18 and 20 in FIG. 1), and since the travel in the direction 117 is at a predetermined higher rate than the travel of the cartoner and infeed conveyors, the ratio being such as to advance the pusher fingers 26 longitudinally of the infeed conveyor at the same rate that the infeed conveyor travels, there will be resultant lateral travel of the fingers 26 relative to the infeed conveyor as indicated by the arrows 24, the actual product movement relative to the frame of the machine being according to the arrows 22.

At position (2) the product will have entered about halfway into the carton, and at position (3) almost all the way in, the final position being somewhere between (3) and (4) and illustrated in FIG. 2. Thereupon the cam roller 144 which has been following the cam surface 132 of the frame member 122 will begin traversing the cam surface 134 as shown in FIG. 6 which swings the pusher 26 away from the product so that the pusher does not interfere with the continued forward movement of the carton and its product to the right hand three positions shown in FIG. 1 where certain end flaps of the carton are successively closed to complete the package as in the final position at the upper right corner of FIG. 1.

Referring to FIG. 9 the finger extensions 27 pass between the slats 92, 94 and 96 successively and since they terminate below the upper surfaces of the slats prevent any possibility of the boards 16 wedging under the pushers 26 during the pushing operation. The product 14 is pushed across the shelf 112 and finally across the grating 113 which permits passage of the extensions 27 whereas they would catch on the shelf if it were extended to occupy the position of the grating. The camming arrangement at the cam surface 132 insures a square presentation of the fingers 26 to the ends of successive quantities of product 14 and boards 16 while the rollers 154 and 156 stabilize the movement of the fingers 26 and insure proper alignment of the extensions 27 with the spaces between the slats of the infeed conveyor. When the cam roller 144 reaches the cam surface 134 (which is a retrograde surface) it cooperates with that surface in such manner as to withdraw the fingers from engagement with the product without interfering with the further movement of the cartoned product, and the successive cam surfaces 136, 138, 140 and 142 control the product feeders in such manner as to present them again at the proper angle by the time they reach position (9).

While we have described our feeder in relation to a cartoning machine, it is operable to push spaced units of product from a first conveyor and merely onto a second conveyor traveling side-by-side relative to the first conveyor.

Some changes may be made in the construction and arrangement of the parts of our product feeder for cartoning machine without departing from the real spirit and purpose of our invention, and it is our intention to cover by our claims any modified forms of structure or use of mechanical equivalents which may reasonably be included within their scope.

We claim as our invention:

1. In a product feeder of the character disclosed, an infeed conveyor for spaced units of product adapted to be located side-by-side relative to a first conveyor and to move in the same direction and at the same speed as the first conveyor, and means for pushing product from said infeed conveyor onto the first conveyor comprising a plurality of pushers spaced the same distance apart as the units of product on said infeed conveyor, means for mounting said pushers for travel at an angle crossing said infeed conveyor and at a speed in the direction of movement of said infeed conveyor which corresponds to the infeed conveyor speed whereby said pushers successively engage the spaced units of product and move them laterally from said infeed conveyor and onto the first conveyor, said infeed conveyor comprising a plurality of sections which are spaced apart laterally of the direction of travel of the conveyor, and drag strips located in the spaces between said sections for supporting the units of product before they are engaged by said pushers.

2. In a feeder of the character disclosed, an infeed conveyor for spaced units of product adapted to be located side-by-side relative to a first conveyor and to move in the same direction and at the same speed as the first conveyor, a stationary shelf between said conveyors, a spaced-bar grating forming a continuation of said shelf, and means for pushing product from said infeed conveyor across said shelf and grating, and onto said first conveyor comprising a plurality of pushers spaced the same as the units of product on said infeed conveyor, means for mounting said pushers for travel at an angle crossing said infeed conveyor and at a speed in the direction of movement of said infeed conveyor which corresponds to the infeed conveyor speed whereby said pushers successively engage the spaced units of product and move them laterally from said infeed conveyor, across said shelf and grating, and onto said first conveyor, the bars of said grating extending parallel to the direction of travel of said pushers said infeed conveyor including spaced slats transversely thereof and said pushers including extensions which travel in the spaces between said slats and in the spaces between the bars of said grating.

3. In a product feeder of the character disclosed, an infeed conveyor adapted to be located side-by-side relative to a first conveyor and to move in the same direction and at the same speed as the first conveyor, and means for pushing spaced units of product from said infeed conveyor onto the first conveyor comprising a plurality of pushers spaced the same as the units on said infeed conveyor, means for mounting said pushers for travel at an angle crossing said infeed conveyor and at a speed in the direction of movement of said infeed conveyor which corresponds to the infeed conveyor speed whereby said pushers successively engage the spaced units of product and move them laterally from said infeed conveyor and onto the first conveyor, said means for mounting said pushers including a chain to which the pushers are pivoted, a cam roller carried by each pusher and a cam for coaction therewith, said cam, while the pushers are engaging units of product, holding them aligned with the end of the product which they engage, and when the product has been completely moved from said infeed conveyor to the first conveyor effecting retracting movement of the pushers in relation to the product, said infeed conveyor being formed of transversely extending spaced slats and said pushers having downward extensions that travel in overlapping relation between successive slats.

4. In a product feeder, an infeed conveyor for spaced units of product adapted to be located side-by-side relative to a cartoning conveyor, and means for pushing product from said infeed conveyor and into cartons carried by said cartoning conveyor comprising a plurality of pushers spaced the same distance apart as the units of product on said infeed conveyor, means for mounting said pushers for travel at an angle crossing said infeed conveyor and at a speed in the direction of movement of the infeed conveyor which corresponds to the infeed conveyor speed whereby said pushers successively engage the spaced product and move it laterally from said infeed conveyor and into the cartons of said cartoning conveyor, said means including a chain to which the pushers are pivoted, a cam roller carried by each pusher and a cam for coaction therewith, said cam aligning said pushers with the product which they engage, and when the product has been completely moved into the carton effecting retracting movement of the pushers, said infeed conveyor being formed of spaced rows of spaced slats and said pushers having extensions that travel between the side edges of successive slats of said rows, and successively traverse the widths of said rows.

5. In a product feeder, an infeed conveyor for spaced product adapted to be located side-by-side relative to a cartoning conveyor and to move in the same direction and at the same speed as the cartoning conveyor, a stationary shelf and a grating extension thereof between said conveyors said grating extension having spaces therein, and means for pushing product from said infeed conveyor across said shelf and grating into cartons carried by said cartoning conveyor comprising a plurality of pushers, means for mounting said pushers for travel at an angle crossing said infeed conveyor and at a speed in the direction of movement of said infeed conveyor which corresponds to the infeed conveyor speed whereby said pushers successively engage the spaced product and move it laterally from said infeed conveyor across said shelf and grating and into the cartons of said cartoning conveyor, said spaces of said grating extending at the same angle as the direction of travel of said extensions, said infeed conveyor being formed of spaced slats and said pushers having extensions that travel between the side edges of successive slats and through said spaces of said grating.

6. In a product feeder, an infeed conveyor for spaced product adapted to be located side-by-side relative to a cartoning conveyor and to move in the same direction and at the same speed as the cartoning conveyor, a stationary shelf and a grating extension thereof between said conveyors, and means for pushing product from said infeed conveyor across said shelf and grating into cartons carried by said cartoning conveyor comprising a plurality of pushers, means for mounting said pushers for travel at an angle crossing said infeed conveyor and at a speed in the direction of movement of said infeed conveyor which corresponds to the infeed conveyor speed whereby said pushers successively engage the spaced product and move it laterally from said infeed conveyor across said shelf and grating and into the cartons of said cartoning conveyor, said means for mounting said pushers including a chain to which the pushers are pivoted, cam rollers carried by said pushers, a cam for coaction therewith, said cam, while the pushers are engaging product, holding them aligned with the end of the product which they engage, and when the product has been completely moved from the infeed conveyor and into the carton, effecting retracting movement of the pushers, and means to retain said pushers properly oriented while they are pushing product from said infeed conveyor into cartons on said cartoning conveyor comprising a pair of rollers carried by each pusher and spaced from the portion of said chain connected to the pusher, and stationary tracks extending longitudinally of said infeed conveyor and receiving said rollers.

References Cited in the file of this patent

UNITED STATES PATENTS

| | | |
|---|---|---|
| 1,935,269 | Jones | Nov. 14, 1933 |
| 2,133,248 | Jones | Oct. 11, 1938 |
| 2,584,529 | Allen | Feb. 5, 1952 |
| 2,805,755 | Jones | Sept. 10, 1957 |
| 2,828,595 | Talbot et al. | Apr. 1, 1958 |
| 2,979,873 | Galloway | Apr. 30, 1961 |